United States Patent [19]

Sugimoto et al.

[11] 4,396,344
[45] Aug. 2, 1983

[54] INDUSTRIAL ROBOT OF THE ARTICULATED TYPE

[75] Inventors: Koichi Sugimoto; Michinaga Kohno; Yoshio Matsumoto, all of Yokohama, Japan

[73] Assignee: Hitachi, Ltd., Tokyo, Japan

[21] Appl. No.: 196,252

[22] Filed: Oct. 10, 1980

[30] Foreign Application Priority Data

Oct. 12, 1979 [JP] Japan .................. 54-130821

[51] Int. Cl.³ ............................... B25J 9/00
[52] U.S. Cl. ........................ 414/735; 414/917; 414/706
[58] Field of Search ........... 414/1, 4, 7, 917, 732, 414/733, 735, 694, 700, 687, 706

[56] References Cited

U.S. PATENT DOCUMENTS

| | | | |
|---|---|---|---|
| 3,630,389 | 12/1971 | Schmidt | 414/4 |
| 4,062,455 | 12/1977 | Flatau | 414/4 X |
| 4,076,131 | 2/1978 | Dahlstrom | 414/735 X |
| 4,078,670 | 3/1978 | Francois | 414/4 |
| 4,140,226 | 2/1979 | Richter | 414/917 X |
| 4,234,150 | 11/1980 | Mee | 414/4 X |
| 4,299,533 | 11/1981 | Ohnaka | 414/733 X |

FOREIGN PATENT DOCUMENTS

| | | | |
|---|---|---|---|
| 2628734 | 12/1977 | Fed. Rep. of Germany | 414/7 |
| 2701151 | 6/1978 | Fed. Rep. of Germany | 414/733 |

OTHER PUBLICATIONS

ASEA Information YB110-30ZE, Industrial Robot System, 9/76.
ASEA Pamphlet YB11-101E, Industrial Robot System, 4/77.

Primary Examiner—Robert J. Spar
Assistant Examiner—Terrance L. Siemens
Attorney, Agent, or Firm—Antonelli, Terry & Wands

[57] ABSTRACT

An industrial robot of the articulated type including a swivelling pedestal capable of swivelling about a vertical axis by force of a drive motor, a first brachium supported for pivotal movement about a first axis disposed horizontally on the pedestal, a lever supported for pivotal movement about the first axis, a second brachium connected at one end to a pivoting end of the lever for pivotal movement, a forearm connected to the other end of the second brachium and a pivoting end of the first brachium for pivotal movement and cooperating with the first and second brachiums and the lever to constitute a quadric parallel motion mechanism, and a wrist mounted on one end of the forearm. A motor pivotally moving the first brachium and a motor for pivotally moving the lever are mounted on the first axis, and a motor for driving the wrist is mounted on a connection between the lever and the second brachium, with the stator side of the wrist drive motor being secured to the pedestal together with the lever by the quadric parallel motion mechanism. Rotation of the wrist drive motor is transmitted through parallel links to a rotary member on a connection between the second brachium and forearm and a rotary member on a connection between the forearm and the wrist, whereby the wrist can be moved both pivotally and rotationally.

20 Claims, 16 Drawing Figures

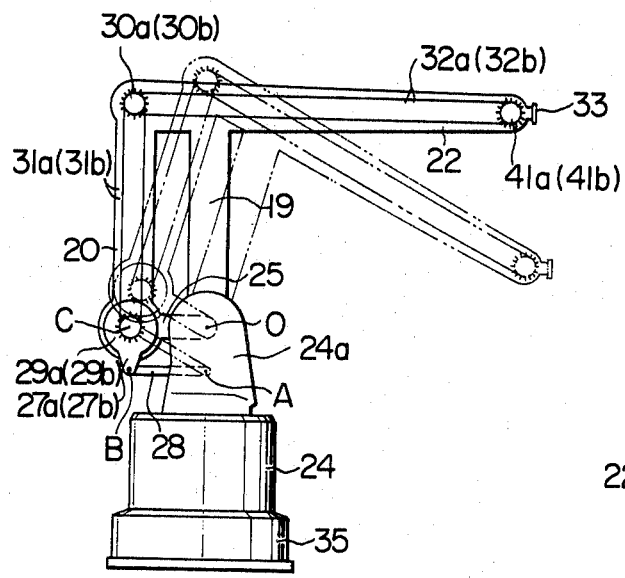
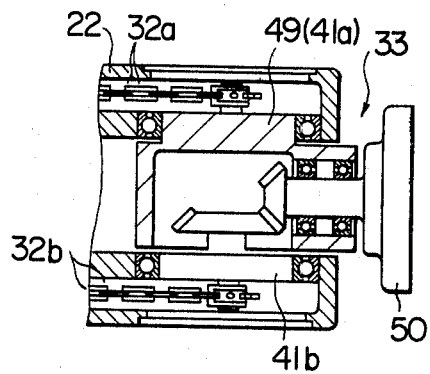
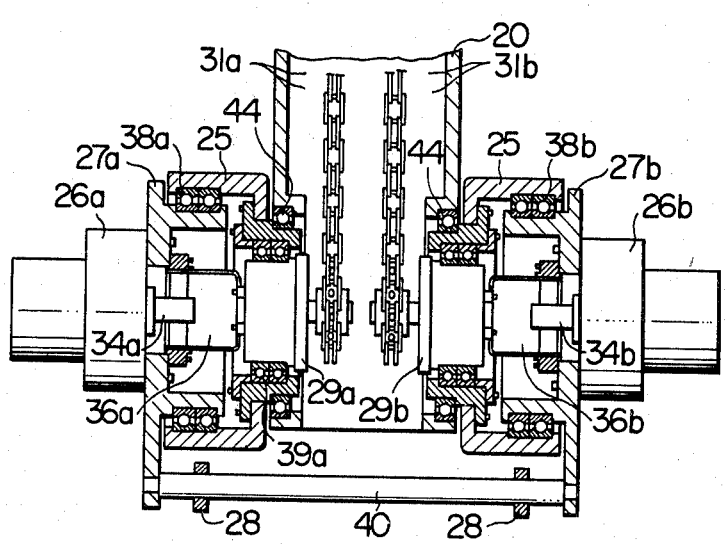

INDUSTRIAL ROBOT OF THE ARTICULATED TYPE

BACKGROUND OF THE INVENTION

This invention relates to an industrial robot of the articulated type.

An example of industrial robot of the articulated type of the prior art is shown in FIGS. 1–3. The industrial robot shown is constructed such that as shown in FIGS. 1 and 3 rotational movement of a brachium drive motor 2 is converted into straight forward movement of a nut 3b in meshing engagement with a feed screw 3a to cause a brachium 1 to move in pivotal movement in the directions of arrows in FIG. 1 through link 4, and that as shown in FIGS. 2 and 3 rotational movement of a forearm drive motor 6 is converted into straightforward movement of a nut 7b in meshing engagement with a feed screw 7a to cause a forearm 5 to move in pivotal movement in the directions of arrows in FIG. 2 through a rod 8.

FIG. 4 shows a wrist drive mechanism of the industrial robot of the articulated type of the prior art comprising a wrist drive motor 9 (see FIG. 3) mounted in the center of pivotal movement of the brachium 1 and including an output shaft connected to a disk 11 to move the latter in swinging movement. Swinging movement of the disk 11 is transmitted through links 14 and 15 to another disk 12 to cause the latter to move in swinging movement and to cause another disk 13 to also move in swinging movement through links 16 and 17, to thereby move a wrist 18 vertically in pivotal movement. The links 14 and 15 and the disks 11 and 12 constitute a linkage of the parallelogram shape, and the links 16 and 17 and the disks 12 and 13 constitute another linkage of the parallelogram shape. Thus the wrist 18 can have its posture kept constant irrespective of the postures of the brachium 1 and the forearm 5.

Some disadvantages are associated with the industrial robot of the articulated type of the prior are described hereinabove. More specifically, since rotational movement of a drive motor is converted into straightforward movement of a nut meshing with a feed screw, the angle of rotation of the drive motor would fail to be proportional to the angle of pivotal movement of the brachium or forearm, thereby complicating calculation of the coordinates. A mechanism using a feed screw would have a shorter service life than a mechanism relying only on roller bearings for transmission of movement because wear would soon be caused on the feed screw.

SUMMARY OF THE INVENTION

This invention has been developed for the purpose of obviating the aforesaid disadvantages of the prior art. Accordingly, the invention has as its object the provision of an industrial robot of the articulated type, highly balanced and stable, which enables calculation of the coordinates to be readily performed and which has a long service life because less wear is caused on its component parts than on those of the prior art.

The aforesaid object can be accomplished according to the invention by providing an industrial robot of the articulated type comprising swivelling pedestal moved in swivelling movement about a vertical axis by a pedestal drive motor, a first brachium supported for pivotal movement about a first axis disposed horizontally on the swivelling pedestal, a lever supported for pivotal movement about the first axis, a second brachium connected at one end thereof to a pivoting end of the lever for pivotal movement, a forearm connected to the other end of the second brachium and a pivoting end of the first brachium for pivotal movement and cooperating with the first brachium, lever and second brachium to constitute a quadric parallel motion mechanism, a wrist mounted on one end of the forearm, a motor moving the first brachium in pivotal movement mounted on the first axis, a motor for moving the lever in pivotal movement mounted on the first axis, a motor for moving the wrist mounted on a connection between the lever and the second brachium, the wrist drive motor being secured on its stator side to the swivelling pedestal by the quadric parallel motion mechanism so as to keep the posture of the wrist constant at all times regardless of the pivotal movement of the lever, a rotary member mounted on a connection between the second brachium and the forearm and a rotary member mounted on a connection between the forearm and the wrist, the wrist drive motor having its rotational output transmitted to the two rotary members through parallel links and the last-mentioned rotary member being connected to the wrist whereby the wrist can be moved in pivotal movement or in rotational movement as the wrist drive motor is actuated. The parallel links may be replaced by chains or other similar pliable members.

BRIEF DESCRIPTION OF THE DRAWINGS

FIG. 11 is a view of a modification of the wrist drive mechanism shown in FIG. 7;

FIG. 12 is a sectional view of the connection between the lever and the second brachium shown in FIG. 11;

FIG. 13 is a sectional view of the second wrist drive mechanism shown in FIG. 10(A) wherein chains are used in place of links.

DESCRIPTION OF THE PREFERRED EMBODIMENTS

Figure 1:
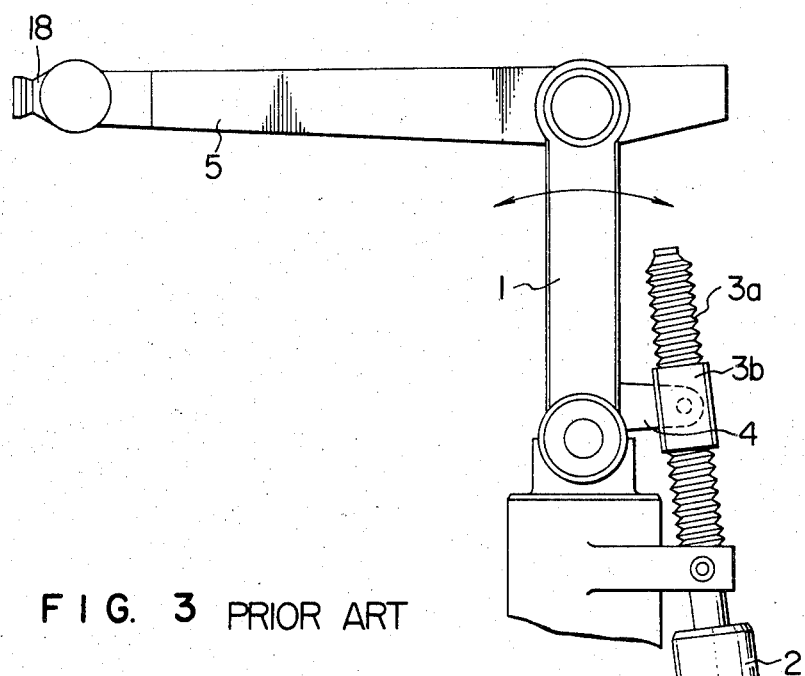
FIG. 1 is a left side view of an industrial robot of the articulated type of the prior art.
Figure 3:
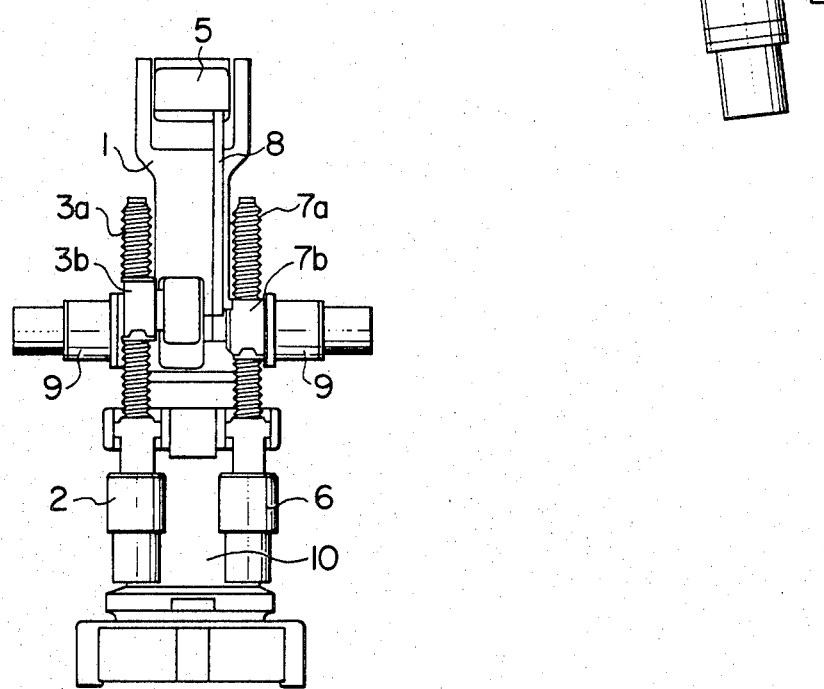
FIG. 3 is a front view of the industrial robot shown in FIGS. 1 and 2.
Figure 2:
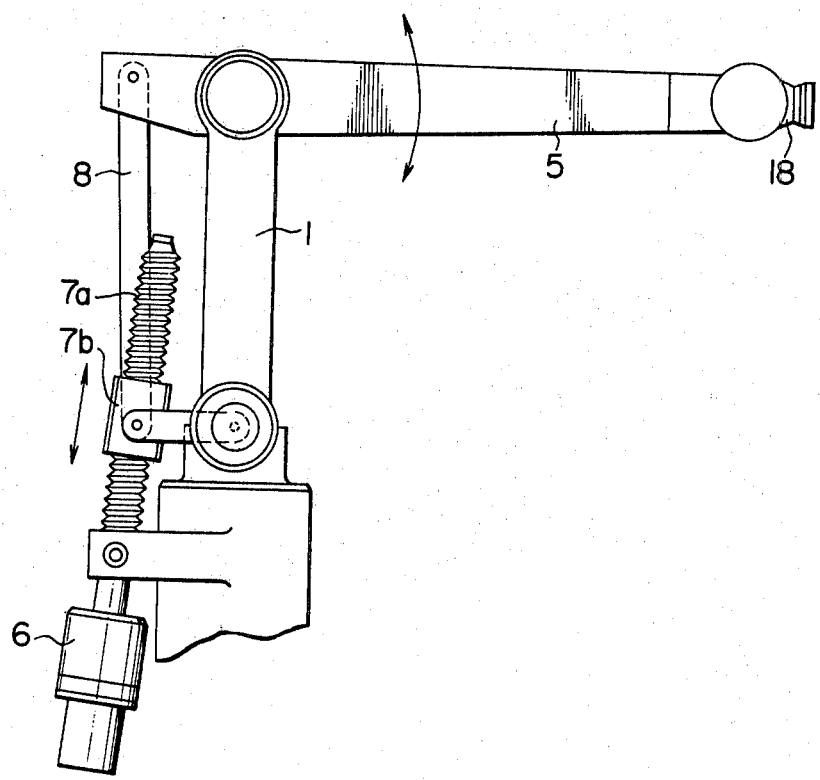
FIG. 2 is a right side view of the industrial robot shown in FIG. 1.
Figure 4:
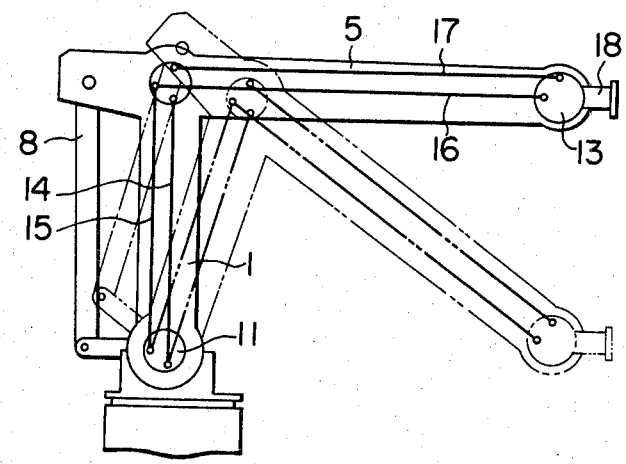
FIG. 4 is a side view of the wrist drive mechanism of the industrial robot shown in FIGS. 1–3.
Figure 5:
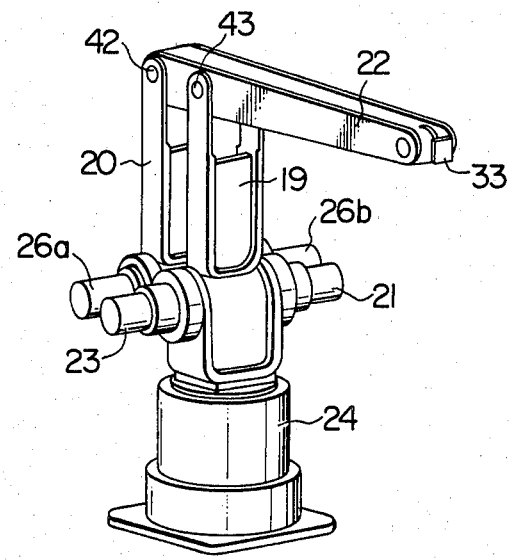
FIG. 5 is a perspective external view of the industrial robot of the articulated type comprising one embodiment of the invention.
Figure 6:
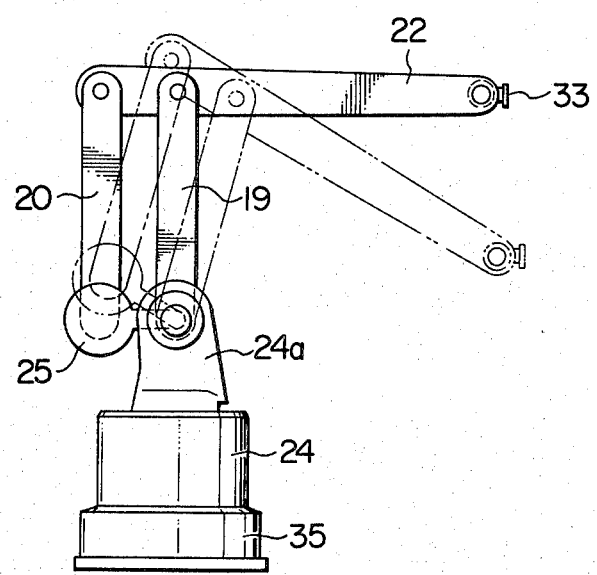
FIG. 6 is a side view of the industrial robot shown in FIG. 5.
Figure 7:
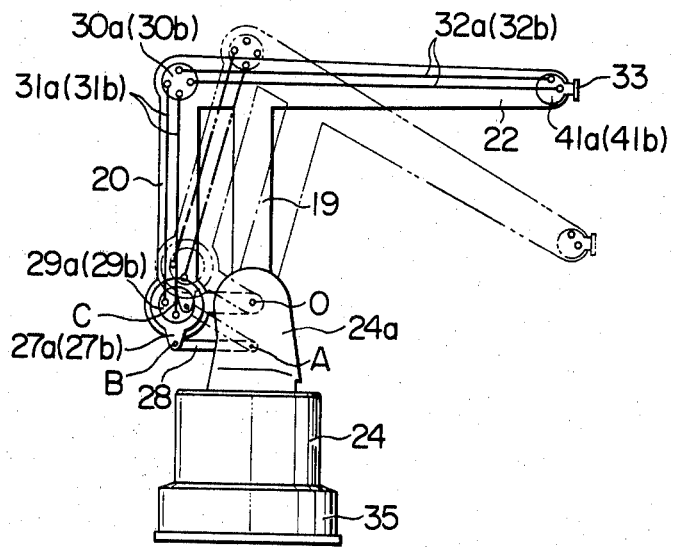
FIG. 7 shows one form of wrist drive mechanism of the industrial robot shown in FIGS. 5 and 6.
Figure 8:
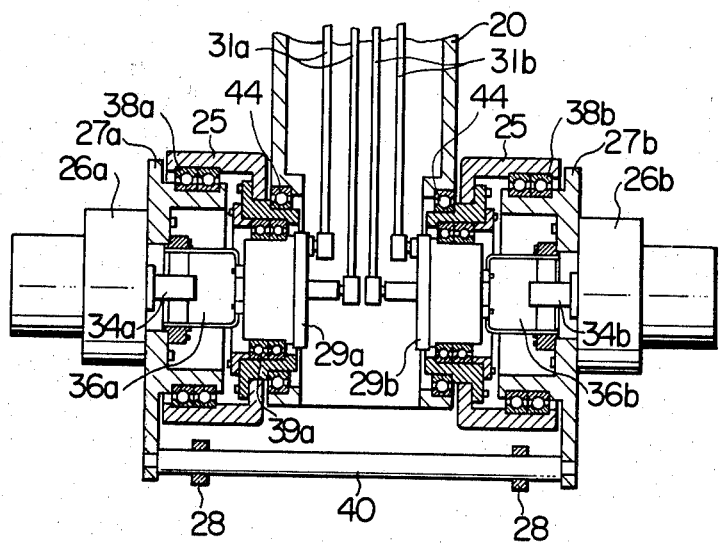
FIG. 8 is a sectional view of the connection between the lever and the second brachium shown in FIG. 7.
Figure 14:
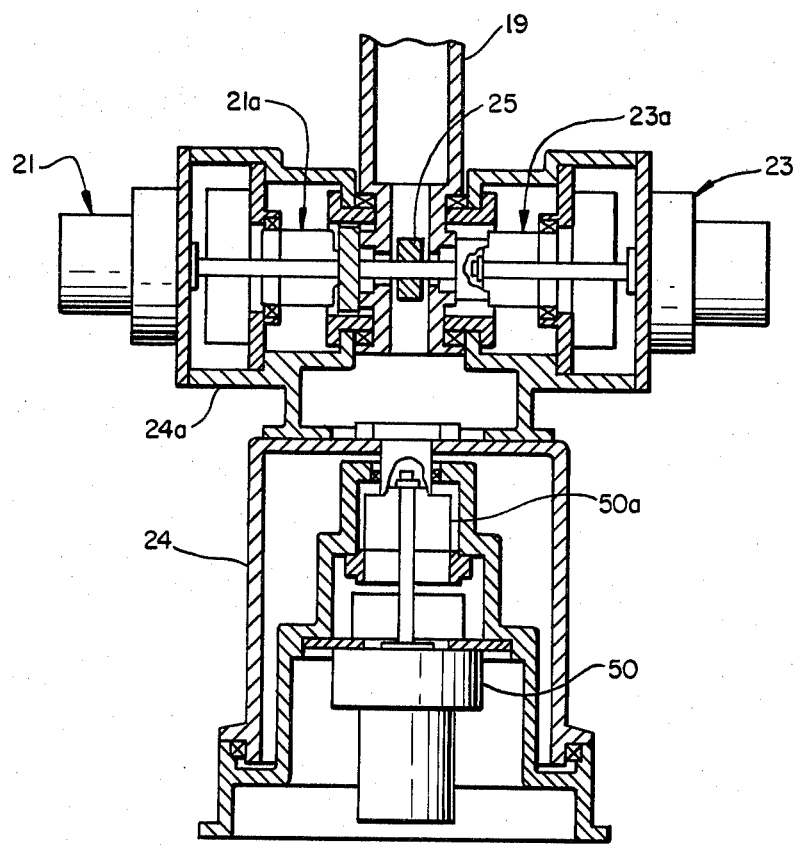
FIG. 14 is a section view showing the first brachium, forearm and pedestal drive mechanisms.

FIGS. 5, 6, 7 and 8 show one embodiment of the industrial robot of the articulated type in conformity with the invention. A swivelling pedestal 24 mounted on a base 35 for swivelling movement about a vertical center axis has a swivelling pedestal drive motor 50 (FIG. 14), mounted in the base 35 and having an output shaft connected to the pedestal 24 through a speed reducing gearing 50a on the vertical center axis. A first brachium 19 supported by a U-shaped frame 24a on an upper surface of the swivelling pedestal 24 for pivotal movement about a center O (See FIG. 7) is connected, through a speed reducing gearing 21a (FIG. 14) to an output shaft of a first brachium drive motor 21 having an axis on the center O of the one side of the frame 24a. A lever 25 supported by another U-shaped frame 24a on the upper surface of the swivelling pedestal 24 for pivotal movement about the center O is connected, through a speed reducing gearing 23a to an output shaft of a forearm drive motor 23 having an axis on the center O of the other side of the frame 24a. The numeral 20 designates a second brachium connected at one end thereof to a pivoting end of the lever 35 through a bearing 44 as shown in FIG. 8. A forearm 22 having attached to its forward end a wrist 33 provided with a chuck, for example, for gripping an article is connected at its rear end to the other end of the second brachium 20 for pivotal movement about a pin 42. The forearm 22 is pivotally connected at its intermediate portion to a pivoting end of the first brachium 19 for pivotal movement about a pin 43. The first brachium 19 and the second brachium 20 are parallel to each other and the lever 25 and the forearm 22 are parallel to each other, so that the first brachium 19, second brachium 20, lever 25 and forearm 22 constitute a quadric parallel motion mechanism.

Rotational movement of the first brachium drive motor 21 directly moves the first brachium 19 in pivotal movement after having its speed reduced by the speed reducing gearing. Rotational movement of the forearm drive motor 23 directly moves the lever 25 in pivotal movement after having its speed reduced by the speed reducing gearing, and pivotal movement of the lever 25 causes the forearm 22 to move in pivotal movement through the same angle via the second brachium 20.

FIGS. 7 and 8 show a mechanism for driving the wrist 33. The numerals 26a and 26b designate wrist drive motors secured to members 27a and 27b rotatably supported by bearings 38a and 38b respectively at the pivoting end of the lever 25 at a connection at which the lever 25 is pivotally connected to the second brachium 20. The numeral 28 designates a link connected at one end thereof to the swivelling pedestal 24 at a point A for pivotal movement and at the other end thereof to a pivotal end B (a bar 40 connecting the members 27a and 27b together) of the members 27a and 27b for pivotal movement. The lever 25 and the link 28 are disposed parallel to each other, and a link AO on the swivelling pedestal 24 is disposed parallel to the members 27a and 27b, to thereby constitute a parallel motion mechanism.

Disks 29a and 29b connected to the wrist drive motors 26a and 26b through speed reducing gearings 36a and 36b are rotatably supported at the pivoting end of the lever 25 by bearings 39a and 39b respectively. Disks 30a and 30b are rotatably supported, coaxially with pin 42, by the connection between the second brachium 20 and the forearm 22. Disks 41a and 41b are supported for rotation by the connection between the forearm 22 and the wrist 33. Links 31a and 31b constitute a parallel motion mechanism connecting the disks 29a and 29b to the disks 30a and 30b, and links 32a and 32b constitute a parallel motion mechanism connecting the disks 30a and 30b to the disks 41a and 41b. The mechanism for driving the wrist 33 is provided in two systems as indicated by the subscripts a and b attached to the parts, so that the wrist 33 can be pivotally moved in a direction indicated by an arrow Y in FIGS. 9(B) and 10(B) and also the wrist 33 can be moved back and forth (in a direction indicated by an arrow X in FIG. 9(B)) or rotated about its center axis in a direction indicated by an arrow $\theta$ in FIG. 10.

The wrist drive motors 26a and 26b have output shafts 34a and 34b whose rotation rotates the disks 29a and 29b through speed reducing gearings 36a and 36b respectively, to drive the links 31a and 31b. Movement of the links 31a and 31b rotate the disks 30a and 30b which drive the links 32a and 32b, to thereby pivotally move the wrist 33 vertically (in the direction of the arrow) or pivotally move the wrist 33 back and forth to rotate the wrist 33 about its own axis. Meanwhile the members 27a and 27b on the side of the stators of the wrist drive motors 26a and 26b are rotatably supported for rotation about the pivoting end C of the lever 25 through bearings 38a and 38b respectively. The members 27a and 27b have the pivoting end B connected to the point A on the swivelling pedestal 24 through the bar 40 and link 28. Thus the points O and A on the swivelling pedestal 24, the pivoting end B of the members 27a and 27b and the pivoting end C of the lever 25 form a parallelogram when connected together, so that a quadric parallel motion mechanism including a stationary link $\overline{OA}$ is constituted by $\overline{OA}$, $\overline{AB}$, $\overline{BC}$ and $\overline{CO}$. The disks 29a, 29b, disks 30a, 30b and links 31a, 31b constitute quadric parallel motion mechanisms respectively, and the disks 30a, and 30b, disks 41a, 41b and links 32a, 32b constitute quadric parallel motion mechanisms respectively. By virtue of this arrangement, even if the second brachium 20 is moved to shift the wrist drive motors 26a and 26b to alter the inclination of the forearm 22, rotational positions of the disks 29a, 29b, disks 30a, 30b and disks 41a, 41b relative to the stationary link $\overline{OA}$ can be kept constant and hence the posture of the wrist 33 can be kept constant, unless the wrist drive motors 26a and 26b are actuated to rotate the disks 29a, 29b. That is, the posture of the wrist 33 can be kept constant irrespective of the postures of the first brachium 19 and forearm 22, without requiring any special control to be effected.

Figure 9A:
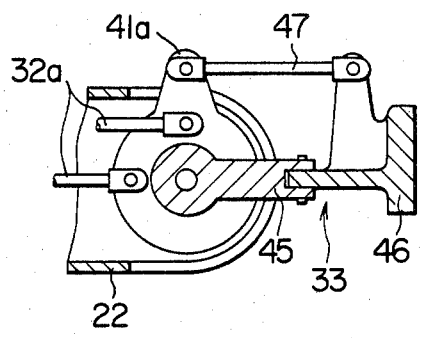
FIG. 9(A) is a sectional view of the first wrist drive mechanism mounted at a forward end of the forearm shown in FIGS. 5 and 6.
Figure 9B:
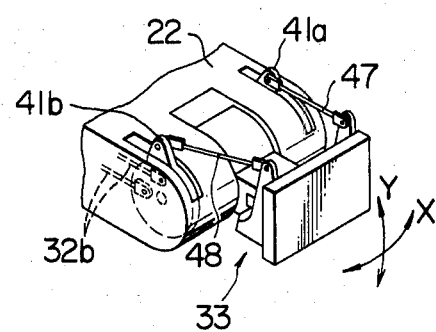
FIG. 9(B) is a perspective view of the first drive mechanism shown in FIG. 9(A)
Figure 10A:
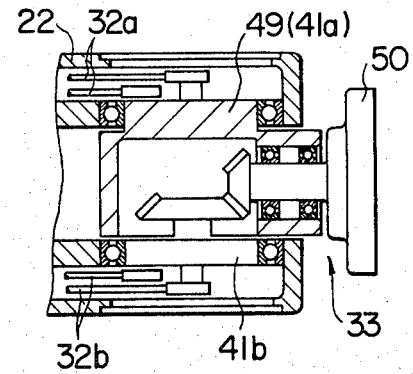
FIG. 10(A) is a sectional view of the second wrist drive mechanism mounted at the forward end of the forearm shown in FIGS. 5 and 6.
Figure 10B:
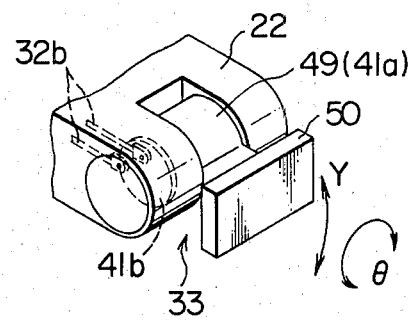
FIG. 10(B) is a perspective view of the wrist drive mechanism shown in FIG. 10(A)

One form of the wrist 33 is shown in FIG. 9 as being mounted on the forward end of the forearm 22, and another form of the wrist 33 is shown in FIG. 10 in the same position. In the constructional form shown in FIG. 9, the wrist 33 includes a lever 45 supported for rotation about the center of rotation of the disks 41a, 41b and a lever 46 connected to a pivoting end of the lever 45 for pivotal movement in a direction perpendicular to the pivotal movement of the lever 45. The lever 46 and the disk 41a are connected to each other at their upper ends by a bar 47, and lever 46 and the disk 41b are connected to each other at their upper ends by a bar 48. The bar 46 is constructed such that a tool can be attached thereto.

Upon the wrist drive motors 26a and 26b being rotated through the same angle of rotation to rotate the disks 41a and 41b through the same angle of rotation, the wrist 33 is turned in the direction indicated by an arrow Y in FIG. 9(B). Upon the wrist drive motors 26a and 26b being rotated through the same angle of rotation in opposite directions to rotate the disks 41a and 41b in the opposite directions through the same angle of rotation, the wrist 33 is turned in the direction of an arrow X as shown in FIG. 9(B).

In the constructional form shown in FIG. 10, the wrist 33 includes a cylinder 49 integral with the disk 41a and rotatably supported by a bearing 51, and a member 50 supported axially by the cylinder 49 through a bearing 52 and having secured thereto a bevel gear meshing with a bevel gear secured to a rear end of the disk 41b. The member 50 is constructed such that a tool can be attached thereto.

If the wrist drive motor 26a alone is rotated, the disk 41a (cylinder 49) will be rotated so that the wrist 33 is turned in the direction of an arrow Y in FIG. 10. If the wrist drive motor 26b alone is rotated, the disk 41b will be rotated so that the wrist 33 is twisted in the direction of an arrow $\theta$ in FIG. 10 through the bevel gears. Thus the tool attached to the wrist 33 can be made to perform various operations, including painting, welding, assembling, burr removing, etc.

As described hereinabove, the motor 21 for driving the first brachium 19 is mounted on the center O of pivotal movement of the first brachium 19 and the output shaft of the motor 21 is directly connected to the first brachium 19 through a speed reducing gearing, and the motor 23 for driving the lever 25 is mounted on the center O of pivotal movement of the lever 25 and the output shaft of the motor 23 is directly connected to the lever 25 through a speed reducing gearing. Thus the motor 21 has only to be rotated through an angle corresponding to the angle of pivotal movement of the first brachium 19. Also the motor 23 has only to be rotated through an angle corresponding to the pivoting angle (angle of inclination) of the forearm 22 disposed parallel to the lever 25. These angles of rotation are proportional to the angles of pivotal movement, thereby facilitating calculation of the coordinates. Since all the parts of the mechanisms are journalled by bearings alone, less wear is caused on the parts than in the prior art, and the robot can have a long service life.

The arranging of the wrist drive motors 26a and 26b on the connecting point C of the lever 25 and the second brachium 20 provides excellent stability because balance can be maintained by the weight of the wrist drive motors 26a and 26b when a load is applied to the wrist 33 as an article is gripped by the chuck attached to the wrist 33. The arrangement whereby the members 27a and 27b on the side of the stators of the wrist drive motors 26a and 26b respectively are connected to form a parallel motion mechanism with the stationary link $\overline{OA}$ on the swivelling pedestal 24 enables the wrist 33 to be kept in a predetermined posture at all times when the forearm 22 is tilted by means of the lever 25.

All the drive motors have each mounted thereon a rotational angle detector, such as a rotary encoder, to enable feedback control to be effected.

In the embodiment shown and described hereinabove, the disks 29a, 29b, 30a, 30b, 41a and 41b and the rod-shaped links 31a, 31b, 32a and 32b are used. However, the same results can be achieved by using sprocket wheels 51a, 51b, 52a, 52b, 53a and 53b in place of the disks 29a, 29b, 30a, 30b, 41a and 41b and by using pliable links, such as chains, in place of the rod-shaped links 31a, 31b, 32a and 32b, as shown in FIGS. 11-13. That is, by forming a parallel motion mechanism including the rotary members and pliable links, such as chains and belts, the same effects as achieved by the embodiment shown in FIGS. 5-10 can be achieved.

The use of the sprocket wheels 51a, 51b, 52a, 52b, 53a and 53b and the pliable links (which are chains) 54a, 54b, 55a and 55b shown in FIGS. 11-13 can achieve the following additional effects.

(1) Rotation of the wrist 33 about its own axis (there is a demand by users for the feature that the tool attached to the wrist 33 can be rotated through 360 degrees) and adjustments of the posture of the wrist 33 can be effected over a range of increased values.

(2) The use of the sprocket wheels and chains permits the first brachium 19 and the forearm 22 to be interconnected by a pin extending from end to end at the point of connection. This is conductive to increased rigidity of the connecting point and increased accuracy with which positioning of the wrist 33 is effected. The same applies to the point of connection between the second brachium 20 and the forearm 22 which can also be connected together by a pin extending from end to end, to thereby increase the rigidity of the connecting point and increase the accuracy with which positioning of the wrist 33 is effected.

(3) The use of the sprocket wheels and chains enables adjustments of the mechanism to be readily effected because the operator has only to be careful not to let the chains slacken.

From the foregoing description, it will be appreciated that the invention enables control of the motors or calculation of the coordinates to be simplified and permits control of the posture and position of the wrist to be effected with increased accuracy. The industrial robot provided by the invention has high stability and prolonged service life.

What is claimed is:

1. An industrial robot of the articulated type comprising:
   a swivelling pedestal movable in swivelling motion about a vertical center axis by rotation of a swivelling pedestal drive motor;
   a first brachium supported for pivotal movement about a first axis disposed horizontally on said swivelling pedestal;
   a lever supported for pivotal movement about said first axis;
   a second brachium connected at one end thereof for pivotal movement to a pivoting end of said lever;
   a forearm connected for pivotal movement to the other end of said second brachium and a pivoting end of said first brachium for cooperation with said first brachium, said lever and said second brachium to provide a first quadric parallel motion mechanism;
   a wrist mounted at one end of said forearm;
   a drive motor for moving said first brachium mounted on said first axis;
   a drive motor for moving said lever mounted on said first axis;
   a first wrist drive motor mounted on a first connection between said lever and said second brachium, said first wrist drive motor being secured on its stator side to the swivelling pedestal together with said lever by a second quadric parallel motion mechanism;

a first rotary member mounted on a second connection between said second brachium and said forearm and having rotation of said first wrist drive motor transmitted thereto through first parallel links; and a second rotary member mounted on a third connection between said forearm and said wrist and having rotation of said first wrist drive motor transmitted thereto through said first parallel links; whereby said wrist can be moved in pivotal movement or in rotational movement upon actuation of said first wrist drive motor.

2. An industrial robot as claimed in claim 1, wherein said first rotary member comprises a sprocket wheel and said first parallel links comprise a pliable endless link in the form of a chain, said pliable endless link being trained over said sprocket wheel.

3. An industrial robot as claimed in claim 1 or 2, wherein said drive motors each have a speed reducing gearing connected thereto.

4. An industrial robot as claimed in claim 1, further comprising a second wrist drive motor mounted on said first connection in juxtaposed relation to said first wrist drive motor, said second wrist drive motor being secured on its stator side to the swivelling pedestal together with said lever by a quadric parallel motion mechanism, a third rotary member mounted on said second connection and having rotation of said second wrist drive motor transmitted thereto through second parallel links, and a fourth rotary member mounted on said third connection and having rotation of said second wrist drive motor transmitted thereto through second parallel links, whereby said wrist can be moved in pivotal movement and in rotational movement with two degrees of freedom upon actuation of said first wrist drive motor and said second wrist drive motor.

5. An industrial robot as claimed in claim 4, wherein said first rotary member and said second rotary member each comprise a sprocket wheel and said first parallel links and said second parallel links each comprise a pliable endless link in the form of a chain, said sprocket wheels each having one of said pliable endless links trained thereover.

6. An industrial robot as claimed in claim 5, wherein said wrist is rotatably supported on said third connection and comprises a cylinder formed integrally with said first rotary member mounted on said third connection, and a member rotatably supported by said cylinder and having a grip end, said member having attached to its rear end a bevel gear in meshing engagement with another bevel gear attached to the second rotary member on said third connection.

7. An industrial robot as claimed in claim 4 or 5, wherein said wrist comprises a first lever pivotally supported on said third connection, and a second lever provided with a grip end pivotally connected to a pivoting end of said first lever and extending in a direction perpendicular to the direction of pivotal movement of said first lever, said second lever having projections at opposite ends thereof connected through links to said first rotary member and said second rotary member on said third connection.

8. An industrial robot as claimed in any one of claims 4–6, wherein said drive motors each have a speed reducing gearing connected thereto.

9. An industrial robot as claimed in claim 7, wherein said drive motors each have a speed reducing gearing connected thereto.

10. An industrial robot of the articulated type comprising:

a parallelogram linkage of rigid members composed of a first brachium, a forearm, a lever and a second brachium;

wherein said first brachium and said lever form a first pair of members and are rotatably supported on a shoulder, said shoulder having a first brachium drive motor and a forearm drive motor mounted thereon;

wherein said first brachium is connected to an output shaft of said first brachium drive motor through a first reducing gearing in such a manner that rotational output motion of the first brachium drive motor is transmitted to said first brachium exclusively by rotational movements; and wherein said lever is connected to an output shaft of said forearm drive motor through a second reducing gearing in such a manner that rotational output motion of the forearm drive motor is transmitted to said lever exclusively by rotational movements; and a wrist, and first and second wrist drive motors connected to said wrist for varying the posture thereof, said first and second wrist drive motors being mounted on a first connection between said lever and said second brachium in a manner for serving as a counterbalance means.

11. An industrial robot according to claim 10, wherein a first drive means for pivotally moving said first brachium and a second drive means for pivotally moving said forearm via said second brachium by pivotally moving said lever are perpendicular to a plane on which said parallelogram linkage is located and are coaxial with respect to each other.

12. An industrial robot of the articulated type as claimed in claim 11, wherein said drive means and said second drive means are located at a first axis about which said first brachium and said lever are supported for pivotal movement.

13. An industrial robot of the articulated type as claimed in claim 10 or 12, wherein said first and second wrist drive motors comprise output shafts which are connected, respectively, through third and fourth reducing gears to said wrist at the forward end of said forearm via a power transmission in a manner enabling said wrist to vary its posture with two degrees of freedom.

14. An industrial robot of the articulated type as claimed in claim 13, wherein said power transmission includes rotational force transmitting portions in the form of sprocket wheels meshing with chains to form parallel motion mechanisms by said sprocket wheels and chains.

15. An industrial robot of the articulated type as claimed in claim 13, wherein said wrist comprises a cylinder rotatably supporated at a forward end of said forearm in a manner to have its center axis oriented perpendicularly to the plane in which said parallelogram linkage is located, a member being rotatably supported in said cylinder with its center axis being directed toward said plane, said member having a grip end at a forward end thereof, a rotary member supported coaxially with said cylinder, and bevel gears for bringing said rotary member and said member into meshing engagement with each other.

16. An industrial robot of the articulated type, comprising:

a swivelling pedestal mounted movably at a vertical center axis on a base;

a first brachium supported at a lower end thereof for pivotal movement about a first axis disposed horizontally on said swivelling pedestal;

a lever supported for pivotal movement about said first axis;

a second brachium pivotally connected at one end thereof to an end of said lever for pivotal movement about a second axis;

a forearm pivotally connected to an opposite end of said second brachium for movement about a third axis and being pivotally connected to an upper end of said first brachium for movement with respect to said first brachium about a fourth axis, a quadric parallel motion mechanism thereby being formed by said first brachium, said lever, said second brachium and a portion of said forearm between said third and fourth axes, said forearm having a second portion extending from the upper end of said first brachium, away from said quadric parallel motion mechanism;

a wrist mounted at an extended end of said second portion of the forearm;

a first brachium drive motor;

a first drive means for pivotally moving said first brachium, said first drive means being mounted on said first brachium at said first axis perpendicularly to a plane of said quadric parallel motion mechanism and connected to said first brachium drive motor in such a manner that the angle of rotation of said first brachium is directly proportional to the angle of rotation of said first brachium drive motor;

a forearm drive motor; and a second drive means for pivotally moving said forearm via said second brachium by pivotally moving said lever, said second drive means being mounted on said lever at said first axis perpendicularly to the plane of said quadric parallel motion mechanism and connected to said forearm drive motor in such a manner that the angle of rotation of said forearm is directly proportional to the angle of rotation of said forearm drive motor;

whereby the moment applied to said quadric motion mechanism about said first axis can be minimized to directly drive said first brachium and said lever by said drive motors.

17. An industrial robot as claimed in claim 16, wherein said first and said second drive means comprise speed reducing gearings.

18. An industrial robot as claimed in claim 16, wherein said first brachium drive motor and said forearm drive motor are disposed on said swivelling pedestal symmetrically relative to said plane of said quadric parallel motion mechanism so that said robot can move in a highly balanced and stable manner.

19. An industrial robot as claimed in claim 16, further comprising a first wrist drive motor for moving said wrist pivotally about a first wrist axis;

a second wrist drive motor for moving said wrist pivotally about a second wrist axis which is perpendicular to said first wrist axis, said first and said second wrist drive motors being mounted on said end of the lever in such a manner that stators of said first and said second wrist drive motors are pivotally mounted with the axes thereof being perpendicular to said plane of said quadric parallel motion mechanism and are connected to said swivelling pedestal to form another quadric parallel motion mechanism so that the posture of said wrist can be kept constant irrespective of the posture of said first brachium and said forearm.

20. An industrial robot as claimed in claim 16, further comprising a first wrist drive motor for moving said wrist pivotally about a first wrist axis;

a second wrist drive motor for moving said wrist pivotally about a second wrist axis which is perpendicular to said first wrist axis, said first and said second wrist drive motors being mounted in such a manner as to be carried by said quadric parallel motion mechanism.

* * * * *